(12) United States Patent
Kim et al.

(10) Patent No.: US 11,012,961 B2
(45) Date of Patent: May 18, 2021

(54) METHOD AND APPARATUS FOR HANDLING ENHANCED RLM PROHIBIT TIMER IN WIRELESS COMMUNICATION SYSTEM

(71) Applicant: LG ELECTRONICS INC., Seoul (KR)

(72) Inventors: Hongsuk Kim, Seoul (KR); Youngdae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 48 days.

(21) Appl. No.: 16/609,687

(22) PCT Filed: May 14, 2018

(86) PCT No.: PCT/KR2018/005484
§ 371 (c)(1),
(2) Date: Oct. 30, 2019

(87) PCT Pub. No.: WO2018/212523
PCT Pub. Date: Nov. 22, 2018

(65) Prior Publication Data
US 2020/0196259 A1    Jun. 18, 2020

Related U.S. Application Data

(60) Provisional application No. 62/505,888, filed on May 13, 2017, provisional application No. 62/505,887, filed on May 13, 2017.

(51) Int. Cl.
*H04W 56/00* (2009.01)
*H04W 4/70* (2018.01)
(Continued)

(52) U.S. Cl.
CPC .......... *H04W 56/003* (2013.01); *H04W 4/70* (2018.02); *H04W 24/10* (2013.01);
(Continued)

(58) Field of Classification Search
None
See application file for complete search history.

(56) References Cited

U.S. PATENT DOCUMENTS

| | | |
|---|---|---|
| 2013/0301542 A1* | 11/2013 | Krishnamurthy ... H04W 72/042 370/329 |
| 2014/0128058 A1* | 5/2014 | Ji ......................... H04W 88/08 455/423 |

(Continued)

OTHER PUBLICATIONS

Ericsson, "Email discussion report [97bis#37][LTE/feMTC] Enhanced RLM", R2-1705034, 3GPP TSG-RAN2 Meeting #98, Hangzhou, China, May 15-19, 2017, see section 3.

(Continued)

*Primary Examiner* — Brian S Roberts
(74) *Attorney, Agent, or Firm* — Dentons US LLP

(57) ABSTRACT

A method and apparatus for transmitting a user equipment (UE) assistance information message in a wireless communication system is provided. Upon receiving N consecutive number of indications of early-out-of-synchronization/early-in-synchronization from a lower layer of the UE, the UE transmits the UE assistance information message including the early-out-of-synchronization/early-in-synchronization indication to the network, and starts a prohibit timer for prohibiting transmission of the UE assistance information message including the early-out-of-synchronization/early-in-synchronization indication to the network. Further, the UE cancels a prohibit timer, if running, for prohibiting transmission of a UE assistance information message including an early-in-synchronization/early-out-of-synchronization indication.

16 Claims, 13 Drawing Sheets

(51) Int. Cl.
| | |
|---|---|
| *H04W 76/38* | (2018.01) |
| *H04W 76/27* | (2018.01) |
| *H04W 24/10* | (2009.01) |
| *H04W 72/04* | (2009.01) |

(52) U.S. Cl.
CPC ....... *H04W 56/001* (2013.01); *H04W 72/042* (2013.01); *H04W 76/27* (2018.02); *H04W 76/38* (2018.02)

(56) References Cited

U.S. PATENT DOCUMENTS

2017/0150444 A1* 5/2017 Li .................. H04B 7/0632
2018/0324702 A1* 11/2018 Takahashi ......... H04W 52/0245
2019/0289510 A1* 9/2019 Rugeland ............. H04W 36/30

OTHER PUBLICATIONS

Ericsson, "Introduction of enhanced RLM reporting", R2-1705027, 3GPP TSG-RAN2 Meeting #98, Hangzhou, China, May 15-19, 2017, see sections 5.6.10.2-5.6.10.3.

Kyocera, "Enhanced RLM reporting", R2-1705806, 3GPP TSG-RAN WG2 #98, Hangzhou, China, May 15-19, 2017, see section 3.

Intel Corporation, "RLM enhancement for eNB-loT and FeMTC", R2-1702997, 3GPP TSG-RAN WG2 #97bis, Spokane, Washington, USA, Apr. 3-7, 2017, see sections 2.1-2.3.

Ericsson, "Enhanced RLM reporting for feMTC", R2-1703036, 3GPP TSG-RAN2 Meeting #97bis, Spokane, USA, Apr. 3-7, 2017, see sections 2-3.

Section 5.3.11 of 3GPP TS 36.331 V14.2.0, "3rd Generation Partnership Project; Technical Specification Group Radio Access Network; Evolved Universal Terrestrial Radio Access (E-UTRA); Radio Resource Control (RRC); Protocol specification (Release 14)", Mar. 2017.

Section 5.6.10 of 3GPP TS 36.331 V14.2.0, "3rd Generation Partnership Project; Technical Specification Group Radio Access Network; Evolved Universal Terrestrial Radio Access (E-UTRA); Radio Resource Control (RRC); Protocol specification (Release 14)", Mar. 2017.

Section 7.6.1 of 3GPP TS 36.133 V14.2.0, "3rd Generation Partnership Project; Technical Specification Group Radio Access Network; Evolved Universal Terrestrial Radio Access (E-UTRA); Requirements for support of radio resource management (Release 14)", Dec. 2016.

* cited by examiner

METHOD AND APPARATUS FOR HANDLING ENHANCED RLM PROHIBIT TIMER IN WIRELESS COMMUNICATION SYSTEM

CROSS-REFERENCE TO RELATED APPLICATIONS

This application is the National Stage filing under 35 U.S.C. 371 of International Application No. PCT/KR2018/005484, filed on May 14, 2018, which claims the benefit of U.S. Provisional Applications No. 62/505,888 filed on May 13, 2017, and No. 62/505,887 filed on May 13, 2017, the contents of which are all hereby incorporated by reference herein in their entirety.

TECHNICAL FIELD

The present disclosure relates to wireless communications, and more particularly, to a method and apparatus for handling an enhanced radio link monitoring (RLM) prohibit timer in a wireless communication system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

A user equipment (UE) performs radio link monitoring (RLM) to determine when there is radio link failure (RLF). When there is RLF, the UE triggers radio resource control (RRC) re-establishment to find another suitable cell. More specifically, the UE performs RLM measurements based on an estimated signal-to-noise ratio (SNR) of cell-specific reference signal (CRS), which is mapped to a hypothetical control channel performance. Based on these RLM measurements, the UE determines a percentage of block error rate (BLER) that is experienced. With these RLM measurements, the UE shall determine $Q_{out}$ (out-of-sync) and $Q_{in}$ (in-sync) which correspond to 10% and 2% BLER respectively.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

SUMMARY

Two new events, i.e. "early-out-of-sync" and "early-in-sync" (or, "very-in-sync") may be introduced for enhanced RLM. The intention with enhanced RLM and the introduction of early-out-of-sync/early-in-sync is to improve intra-cell mobility. By reporting early-out-of-sync/early-in-sync indications, the UE that is under/over-configured may be reconfigured. However, excessive reporting from the UE should be prevented, so a prohibit timer for enhanced RLM event reporting may be required.

In an aspect, a method for transmitting a user equipment (UE) assistance information message by a UE in a wireless communication system is provided. The method includes receiving, at a radio resource control (RRC) layer of the UE, N consecutive number of indications of early-out-of-synchronization from a lower layer of the UE, starting, at the RRC layer of the UE, a first timer for triggering transmission of the UE assistance information message including an early-out-of-synchronization indication to a network, upon expiry of the first timer, transmitting, at the RRC layer of the UE, the UE assistance information message including the early-out-of-synchronization indication to the network, starting, at the RRC layer of the UE, a second timer for prohibiting transmission of the UE assistance information message including the early-out-of-synchronization indication to the network, and canceling, at the RRC layer of the UE, a third timer for prohibiting transmission of a UE assistance information message including an early-in-synchronization indication, if the third timer is running.

In another aspect, a method for transmitting a user equipment (UE) assistance information message by a UE in a wireless communication system is provided. The method includes receiving, at a radio resource control (RRC) layer of the UE, N consecutive number of indications of early-in-synchronization from a lower layer of the UE, transmitting, at the RRC layer of the UE, the UE assistance information message including an early-in-synchronization indication to a network, starting, at the RRC layer of the UE, a first timer for prohibiting transmission of the UE assistance information message including the early-in-synchronization indication to the network, and canceling, at the RRC layer of the UE, a second timer for prohibiting transmission of a UE assistance information message including an early-out-of-synchronization indication, if the second timer is running.

Enhanced RLM reporting can be achieved by handling a prohibit timer efficiently.

DETAILED DESCRIPTION

The following description will focus on 3rd generation partnership project (3GPP) long-term evolution (LTE) advanced (LTE-A). However, technical features of the present disclosure are not limited thereto, and may be applied to other various technologies, e.g. a new radio access technology (new RAT or NR).

Figure 1:
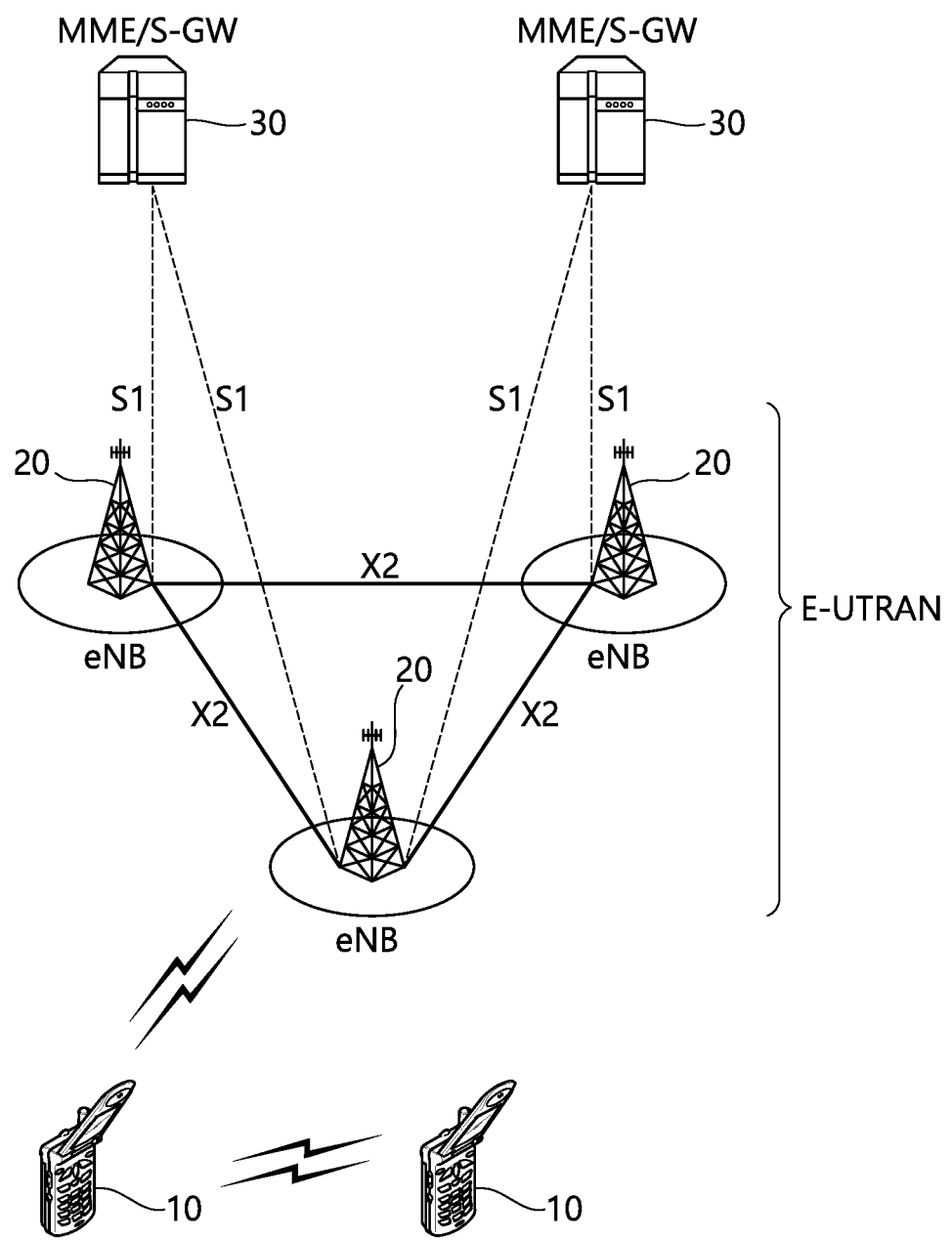
FIG. 1 shows LTE system architecture.

FIG. 1 shows LTE system architecture. Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10. An uplink (UL) denotes communication from the UE 10 to the eNB 20. A sidelink (SL) denotes communication between the UEs 10. In the DL, a transmitter may be a part of the eNB 20, and a receiver may be a part of the UE 10. In the UL, the transmitter may be a part of the UE 10, and the receiver may be a part of the eNB 20. In the SL, the transmitter and receiver may be a part of the UE 10.

The EPC includes a mobility management entity (MME) and a serving gateway (S-GW). The MME/S-GW 30 provides an end point of session and mobility management function for the UE 10. For convenience, MME/S-GW 30 will be referred to herein simply as a "gateway," but it is understood that this entity includes both the MME and S-GW. A packet data network (PDN) gateway (P-GW) may be connected to an external network.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The UEs 10 are connected to each other via a PC5 interface. The eNBs 20 are connected to each other via an X2 interface. Neighboring eNBs may have a meshed network structure that has the X2 interface. The eNB 20 is connected to the gateway 30 via an S1 interface.

Figure 2:
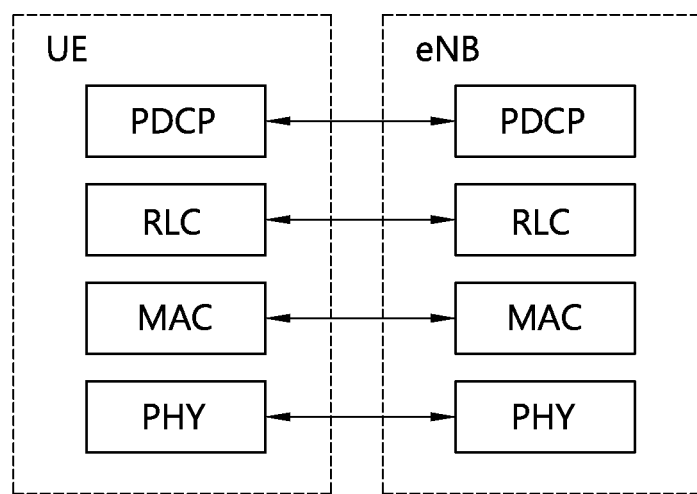
FIG. 2 shows a block diagram of a user plane protocol stack of an LTE system.
Figure 3:
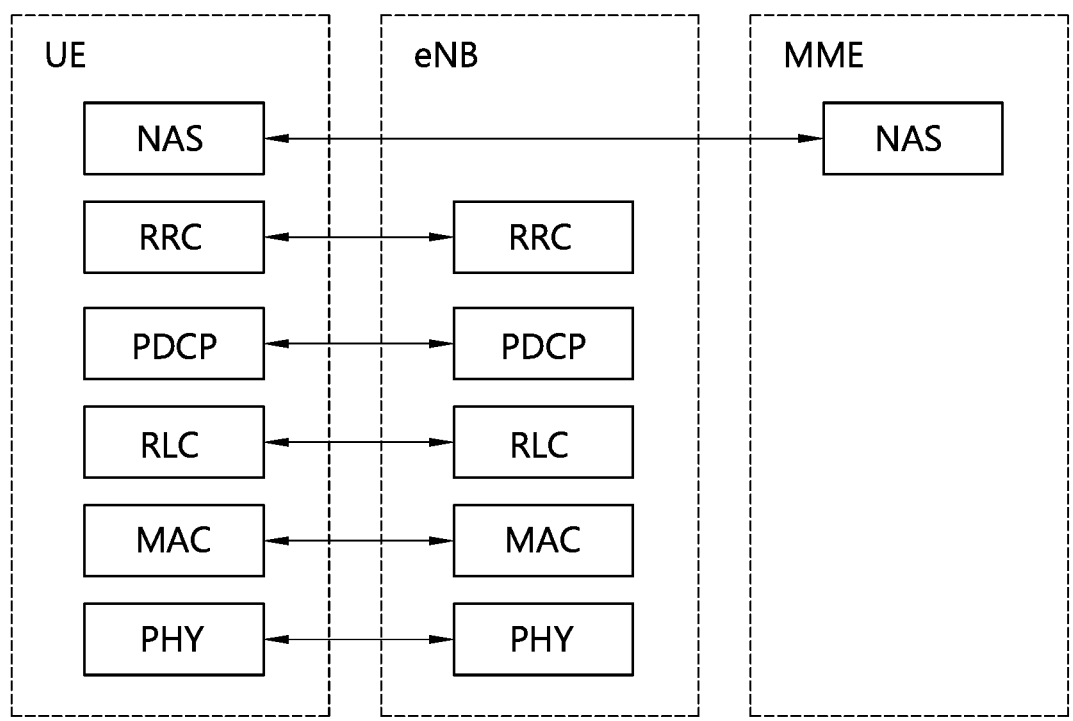
FIG. 3 shows a block diagram of a control plane protocol stack of an LTE system.

FIG. 2 shows a block diagram of a user plane protocol stack of an LTE system. FIG. 3 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 2, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 3, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, and an uplink shared channel (UL-SCH) for transmitting user traffic or control signals. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both UL and DL. The MTCH is a point-to-multipoint downlink channel for transmitting traffic data from the network to the UE.

UL connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

5G system is a 3GPP system consisting of 5G access network (AN), 5G core network (CN), and UE. 5G AN is an access network including new generation radio access network (NG-RAN) and/or non-3GPP access network connected to 5G CN.

Figure 4:
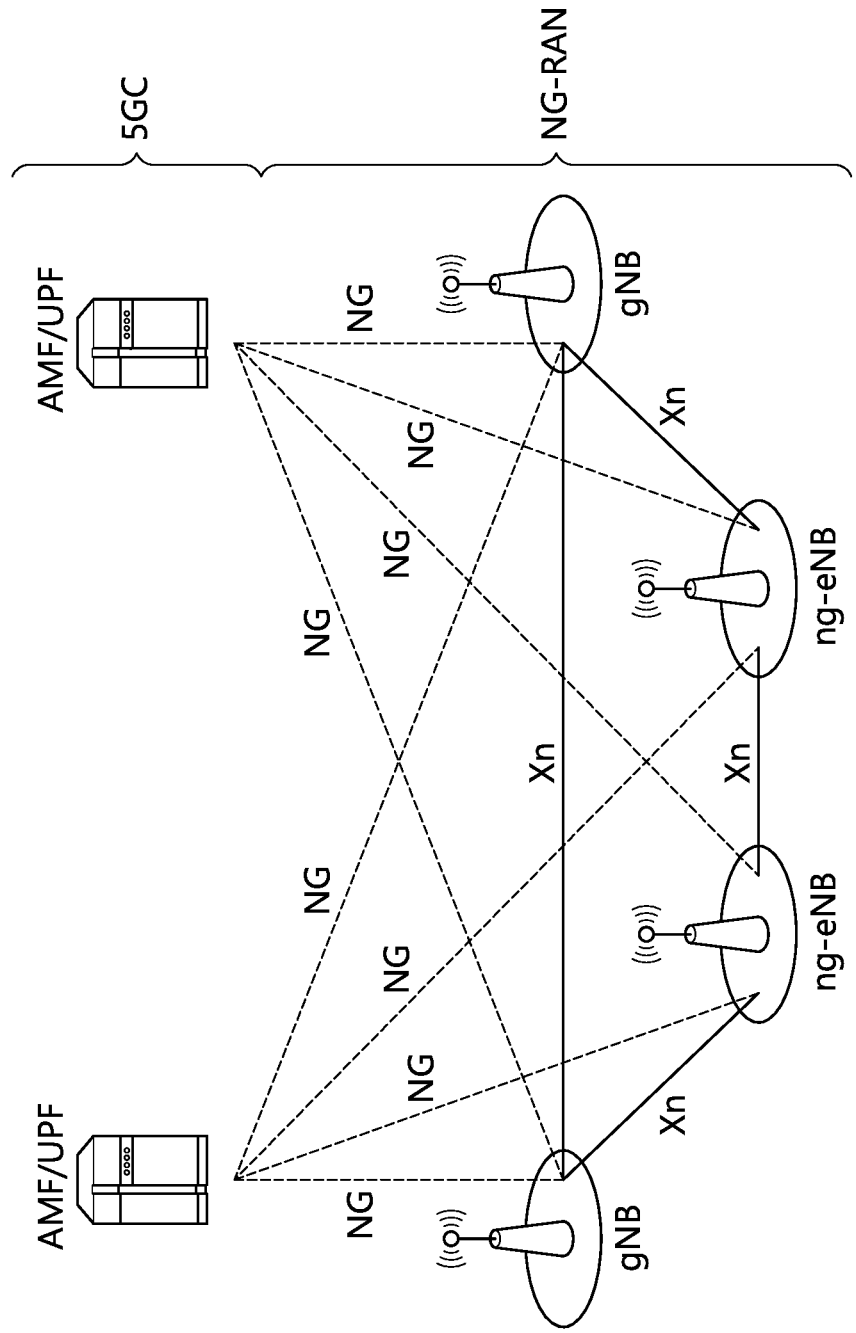
FIG. 4 shows an NG-RAN architecture.

FIG. 4 shows an NG-RAN architecture. Referring to FIG. 4, NG-RAN includes at least one NG-RAN node. The NG-RAN node includes at least one gNB and/or at least one ng-eNB. The gNB provides NR user plane and control plane protocol terminations towards the UE. The ng-eNB provides E-UTRA user plane and control plane protocol terminations towards the UE. The gNBs and ng-eNBs are interconnected with each other by means of the Xn interface. The gNBs and ng-eNBs are also connected by means of the NG interfaces to the 5G CN, more specifically to the access and mobility management function (AMF) by means of the NG-C interface and to the user plane function (UPF) by means of the NG-U interface.

The gNB and ng-eNB host the following functions:
Functions for radio resource management: radio bearer control, radio admission control, connection mobility control, dynamic allocation of resources to UEs in both UL and DL (scheduling);
Internet protocol (IP) header compression, encryption and integrity protection of data;
Selection of an AMF at UE attachment when no routing to an AMF can be determined from the information provided by the UE;
Routing of user plane data towards UPF(s);
Routing of control plane information towards AMF;
Connection setup and release;
Scheduling and transmission of paging messages;
Scheduling and transmission of system broadcast information (originated from the AMF or operations & maintenance (O&M));
Measurement and measurement reporting configuration for mobility and scheduling;
Transport level packet marking in the UL;
Session management;
Support of network slicing;
QoS flow management and mapping to data radio bearers;
Support of UEs in RRC_INACTIVE state;
Distribution function for NAS messages;
Radio access network sharing;
Dual connectivity;
Tight interworking between NR and E-UTRA.
The AMF hosts the following main functions:
NAS signaling termination;
NAS signaling security;
AS Security control;
Inter CN node signalling for mobility between 3GPP access networks;
Idle mode UE reachability (including control and execution of paging retransmission);
Registration area management;
Support of intra-system and inter-system mobility;
Access authentication;
Access authorization including check of roaming rights;
Mobility management control (subscription and policies);
Support of network slicing;
Session management function (SMF) selection.
The UPF hosts the following main functions:
Anchor point for intra-/inter-RAT mobility (when applicable);
External protocol data unit (PDU) session point of interconnect to data network;
Packet routing & forwarding;
Packet inspection and user plane part of policy rule enforcement;
Traffic usage reporting;
UL classifier to support routing traffic flows to a data network;
Branching point to support multi-homed PDU session;
Quality of service (QoS) handling for user plane, e.g. packet filtering, gating, UL/DL rate enforcement;
UL traffic verification (service data flow (SDF) to QoS flow mapping);
DL packet buffering and DL data notification triggering.
The SMF hosts the following main functions:
Session management;
UE IP address allocation and management;
Selection and control of user plane function;
Configures traffic steering at UPF to route traffic to proper destination;
Control part of policy enforcement and QoS;
DL data notification.

UE assistance information is described. Section 5.6.10 of 3GPP TS 36.331 V14.2.0 (2017-03) may be referred. The purpose of this procedure is to inform E-UTRAN of the UE's power saving preference and semi-persistent scheduling (SPS) assistance information, or maximum physical downlink shared channel (PDSCH)/physical uplink shared channel (PUSCH) bandwidth configuration preference. Upon configuring the UE to provide power preference indications, E-UTRAN may consider that the UE does not prefer a configuration primarily optimized for power saving until the UE explictly indicates otherwise.

Figure 5:
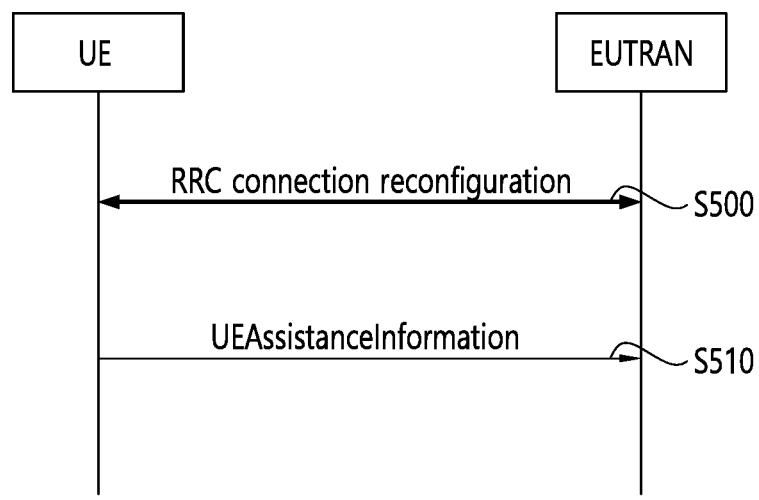
FIG. 5 show a procedure for transmission of UE assistance information message.

FIG. 5 show a procedure for transmission of UE assistance information message. In step S500, RRC connection reconfiguration is performed between the UE and E-UTRAN. In step S510, the UE transmits a UE assistance information message to the E-UTRAN.

More specifically, a UE capable of providing power preference indications in RRC_CONNECTED may initiate the procedure in several cases including upon being configured to provide power preference indications and upon change of power preference. A UE capable of providing SPS assistance information in RRC_CONNECTED may initiate the procedure in several cases including upon being configured to provide SPS assistance information and upon change of SPS assistance information.

A UE capable of coverage enhancement (CE) mode and providing maximum PDSCH/PUSCH bandwidth preference in RRC_CONNECTED may initiate the procedure upon being configured to provide maximum PDSCH/PUSCH bandwidth preference and/or upon change of maximum PDSCH/PUSCH bandwidth preference.

Upon initiating the procedure, the UE shall:
1> if configured to provide power preference indications:
2> if the UE did not transmit a UEAssistanceInformation message with powerPrefIndication since it was configured to provide power preference indications; or
2> if the current power preference is different from the one indicated in the last transmission of the UEAssistanceInformation message and timer T340 is not running:
3> initiate transmission of the UEAssistanceInformation message;
1> if configured to provide maximum PDSCH/PUSCH bandwidth preference:
2> if the UE did not transmit a UEAssistanceInformation message with bw-Preference since it was configured to provide maximum PDSCH/PUSCH bandwidth preference; or:
2> if the current maximum PDSCH/PUSCH bandwidth preference is different from the one indicated in the last transmission of the UEAssistanceInformation message and timer T341 is not running;
3> initiate transmission of the UEAssistanceInformation message;
1> if configured to provide SPS assistance information:
2> if the UE did not transmit a UEAssistanceInformation message with sps-AssistanceInformation since it was configured to provide SPS assistance information; or
2> if the current SPS assistance information is different from the one indicated in the last transmission of the UEAssistanceInformation message:
3> initiate transmission of the UEAssistanceInformation message.

The UE shall set the contents of the UEAssistanceInformation message for power preference indications:

1> if configured to provide power preference indication and if the UE prefers a configuration primarily optimised for power saving:
  2> set powerPrefIndication to lowPowerConsumption;
1> else if configured to provide power preference indication:
  2> start or restart timer T340 with the timer value set to the powerPrefIndicationTimer;
  2> set powerPrefIndication to normal;
1> if configured to provide SPS assistance information:
  2> if there is any traffic for V2X sidelink communication which needs to report SPS assistance information:
    3> include trafficPatternInfoListSL in the UEAssistanceInformation message;
  2> if there is any traffic for UL communication which needs to report SPS assistance information:
    3> include trafficPatternInfoListUL in the UEAssistanceInformation message;

The UE shall set the contents of the UEAssistanceInformation message for bandwidth preference indications:
1> start timer T341 with the timer value set to the bw-PreferenceIndicationTimer;
1> set bw-Preference to its preferred configuration;

The UE shall submit the UEAssistanceInformation message to lower layers for transmission.

Radio link monitoring (RLM) is described. Section 7.6.1 of 3GPP TS 36.133 V14.2.0 (2017-03) and Section 5.3.11 of 3GPP TS 36.331 V14.2.0 (2017-03) may be referred. The UE performs RLM to determine when there is radio link failure (RLF). When there is RLF, the UE triggers RRC re-establishment to find another suitable cell.

The UE shall monitor the DL link quality based on the cell-specific reference signal (CRS) in order to detect the DL radio link quality of the primary cell (PCell) and primary secondary cell (PSCell). The UE shall estimate the DL radio link quality and compare it to the thresholds $Q_{out}$ (for out-of-sync) and $Q_{in}$ (for in-sync) for the purpose of monitoring DL radio link quality of the PCell and PSCell.

The threshold $Q_{out}$ is defined as the level at which the DL radio link cannot be reliably received and shall correspond to 10% block error rate (BLER) of a hypothetical (M)PDCCH transmission taking into account the physical control formation indicator channel (PCFICH) errors with transmission parameters. The threshold $Q_{in}$ is defined as the level at which the DL radio link quality can be significantly more reliably received than at $Q_{out}$ and shall correspond to 2% BLER of a hypothetical (M)PDCCH transmission taking into account the PCFICH errors with transmission parameters.

Figure 6:
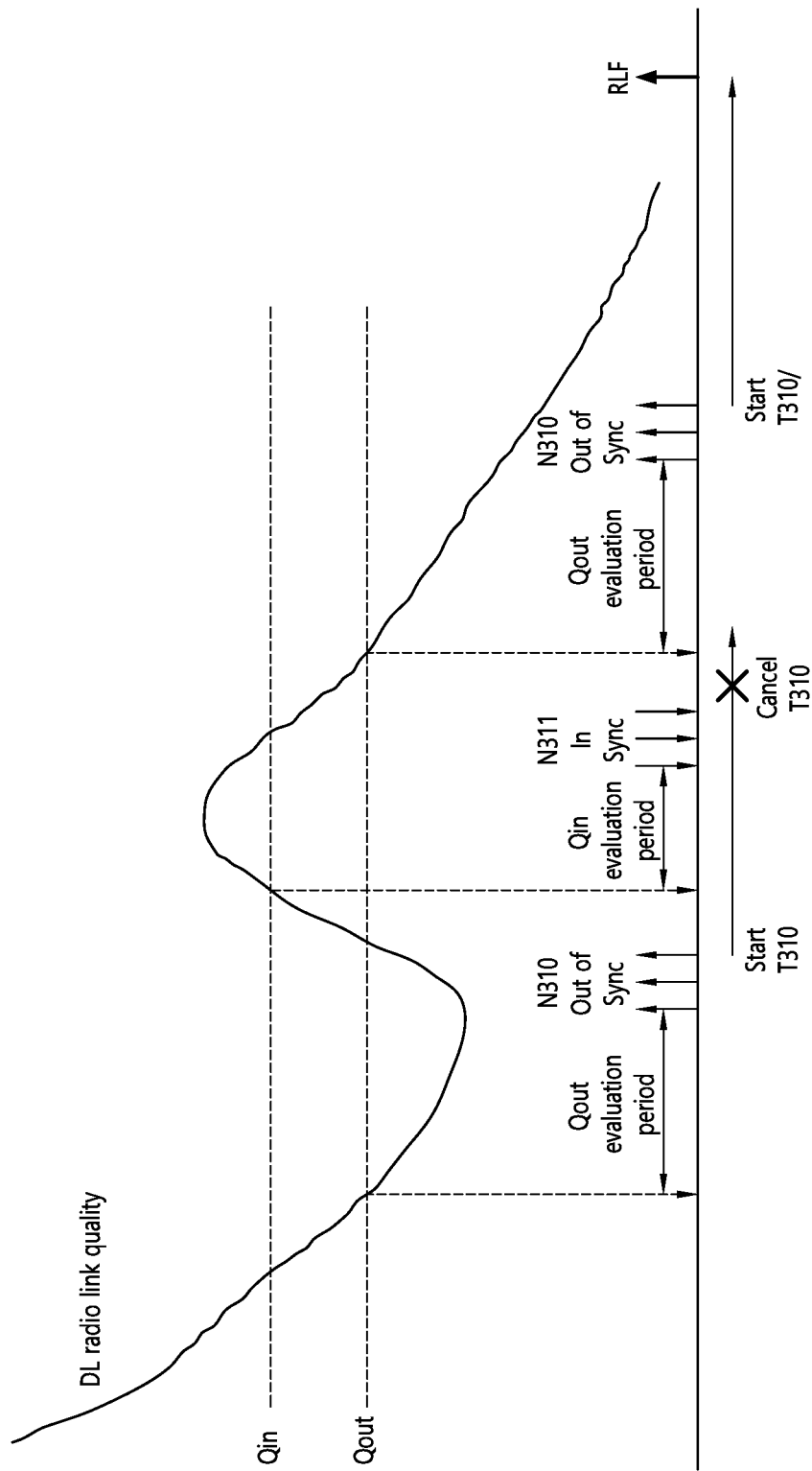
FIG. 6 shows an example of detection of physical layer problems, recovery of physical layer problems, and detection of RLF.

FIG. 6 shows an example of detection of physical layer problems, recovery of physical layer problems, and detection of RLF.

First, detection of physical layer problems is described. DL radio link quality becomes worse, even below $Q_{out}$. During out-of-sync evaluation period, the UE shall:
1> upon receiving N310 consecutive "out-of-sync" indications for the PCell from lower layers while neither T300, T301, T304 nor T311 is running:
  2> start timer T310;
1> upon receiving N313 consecutive "out-of-sync" indications for the PSCell from lower layers while T307 is not running:
  2> start T313.

Second, recovery of physical layer problems is described. While T310/T312 is running, DL radio link quality becomes better, even above $Q_{in}$. During in-sync evaluation period, upon receiving N311 consecutive "in-sync" indications for the PCell from lower layers while T310 is running, the UE shall:
1> stop timer T310;
1> stop timer T312, if running;

In this case, the UE maintains the RRC connection without explicit signaling, i.e. the UE maintains the entire radio resource configuration. Furthermore, periods in time where neither "in-sync" nor "out-of-sync" is reported by layer 1 do not affect the evaluation of the number of consecutive "in-sync" or "out-of-sync" indications.

Upon receiving N314 consecutive "in-sync" indications for the PSCell from lower layers while T313 is running, the UE shall:
1> stop timer T313.

Third, detection of RLF is described. DL radio link quality becomes worse again, even below $Q_{out}$. During out-of-sync evaluation period, the UE shall:
1> upon receiving N310 consecutive "out-of-sync" indications for the PCell from lower layers while neither T300, T301, T304 nor T311 is running:
  2> start timer T310;
1> upon receiving N313 consecutive "out-of-sync" indications for the PSCell from lower layers while T307 is not running:
  2> start T313.

The UE shall:
1> upon T310 expiry; or
1> upon T312 expiry; or
1> upon random access problem indication from master cell group (MCG) MAC while neither T300, T301, T304 nor T311 is running; or
1> upon indication from MCG RLC that the maximum number of retransmissions has been reached for a signaling RB (SRB) or for an MCG or split data RB (DRB):
  2> consider radio link failure to be detected for the MCG i.e. RLF;
  2> if AS security has not been activated:
    3> if the UE is a narrowband internet-of-things (NB-IoT) UE:
      4> perform the actions upon leaving RRC_CONNECTED, with release cause 'RRC connection failure';
    3> else:
      4> perform the actions upon leaving RRC_CONNECTED, with release cause 'other':
  2> else:
    3> initiate the connection re-establishment procedure.

Meanwhile, in addition to RLM described above, enhanced RLM procedure may be introduced. According to the enhanced RLM procedure, two new events, i.e. "early-out-of-sync" and "early-in-sync" (or, "very-in-sync") may be introduced. The intention with enhanced RLM procedure and the introduction of early-out-of-sync (early$Q_{out}$) and early-in-sync (early$Q_{in}$) is to improve intra-cell mobility. When the UE triggers out-of-sync or in-sync, it is dependent on the UE configuration, e.g. CE mode, repetition level, aggregation level. Among these factors, the repetition level is probably the most important factor for triggering out-of-sync or in-sync. It is obvious that a UE that is configured with a lower number of repetitions may experience out-of-sync and RLF more quickly than a UE that is configured with a higher number of repetitions.

Therefore, early-out-of-sync may be detected in order to avoid pending RLF through reconfiguration of additional resources, before detecting out-of-sync. Furthermore, early-in-sync (or, very-in-sync) may be detected after detecting out-of-sync, so that the network resources and power can be saved by reconfiguring a lower number of resources.

Figure 7:
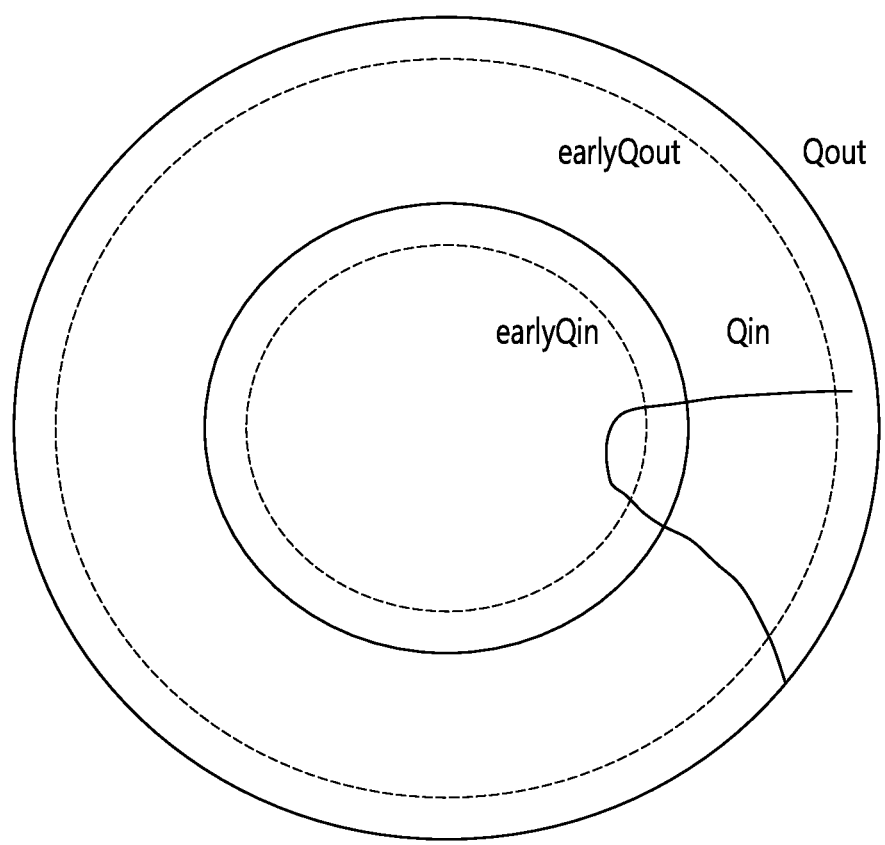
FIG. 7 shows a concept of early-out-of-sync and early-in-sync.

FIG. 7 shows a concept of early-out-of-sync and early-in-sync. Similar as with the existing out-of-sync and in-sync indications from lower layers, the early-out-of-sync and early-in-sync indications may be provided by the lower layers in every 10 ms. The existing out-of-sync and in-sync, i.e. detection and recovery of physical layer problems, remains unchanged with the introduction of early-out-of-sync/early-in-sync. That is, early-out-of-sync/early-in-sync does not influence detection of RLF. Early-out-of-sync should be considered an early detection of physical layer problems and an indication that the UE is under-configured. Early-in-sync should be considered a detection of physical layer improvements and an indication that the UE is over-configured. In the former case, configuration of higher number of repetitions and/or higher aggregation level on MPDCCH may prevent a pending RLF. In the latter case, power and network resources may be saved with fewer repetitions and/or lower aggregation level on MPDCCH. The RLM reporting may also indicate the need for a CE mode change, if applicable.

Layer 3 (L3) filtering of the lower layer indications is required to determine accurately that the UE is under/over-configured. That is, a single lower layer indication does not justify RRC signaling towards the eNB yet. Furthermore, recovery/cancellation during the detection process should be allowed. That is, the UE may start to experience deterioration or improvement of the link, but then experience the opposite. The L3 filtering for early-out-of-sync/early-in-sync may re-use the same mechanism as used with RLF detection. Upon receiving N310 consecutive out-of-sync indications, T310 is started. When N311 consecutive in-sync indications are not received before T310 expires, RLF is declared.

The network node, i.e. eNB/gNB, may act upon receiving the enhanced RLM reports from the UE (e.g. with RRC reconfiguration), otherwise it would not bother to configure these reports. However, the network node may have reasons not to act immediately. Furthermore, excessive reporting from the UE should be prevented.

Therefore, a prohibit timer for enhanced RLM event reporting may be required, and a definition how to introduce the prohibit timer for enhanced RLM reporting may be needed.

In order to solve the problem described above, i.e. definition of prohibit timer for enhanced RLM reporting, an embodiment of the present disclosure provides a method for handling a prohibit timer for enhanced RLM reporting.

Figure 8:
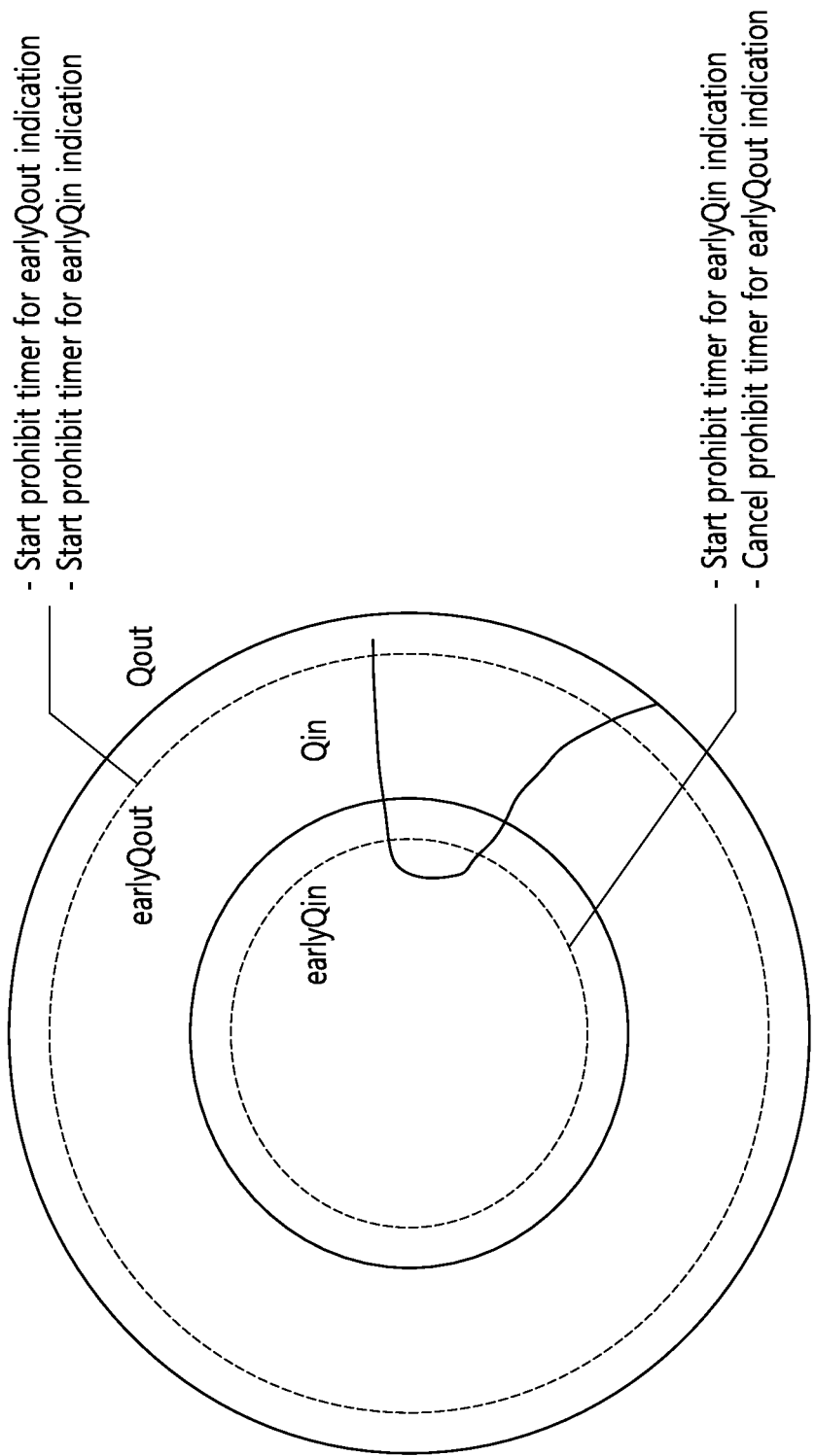
FIG. 8 shows an example of handling a prohibit timer for enhanced RLM reporting according to an embodiment of the present disclosure.

FIG. 8 shows an example of handling a prohibit timer for enhanced RLM reporting according to an embodiment of the present disclosure. Referring to FIG. 8, upon detecting early-out-of-sync, the UE indicates early-out-of-sync indication to the network. Then, the UE starts a prohibit timer for prohibiting the transmission of the same early-out-of-sync indication, and cancels a prohibit timer for prohibiting the transmission of the early-in-sync indication, if running. Furthermore, upon detecting early-in-sync, the UE indicates early-in-sync indication to the network. Then, the UE starts a prohibit timer for prohibiting the transmission of the same early-in-sync indication, and cancels a prohibit timer for prohibiting the transmission of the early-out-of-sync indication, if running.

Figure 9:
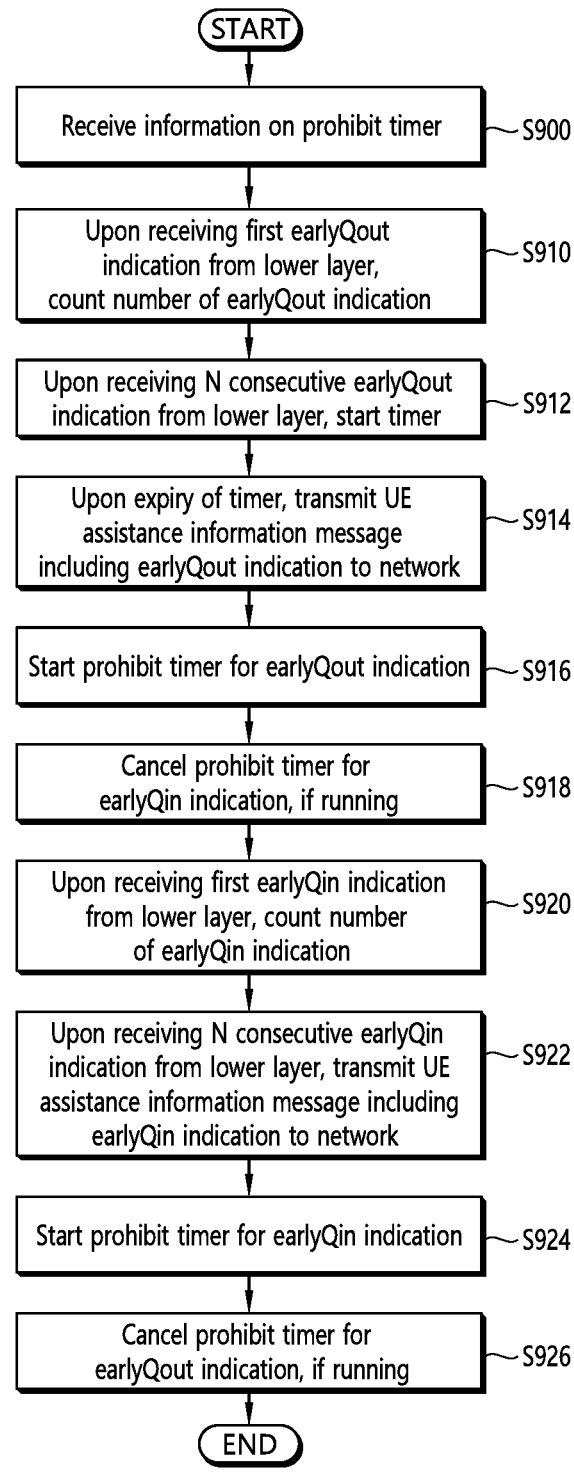
FIG. 9 shows a block diagram of a method for handling a prohibit timer for enhanced RLM reporting according to an embodiment of the present disclosure.

FIG. 9 shows a block diagram of a method for handling a prohibit timer for enhanced RLM reporting according to an embodiment of the present disclosure. In FIG. 9, the network may correspond to an eNB in LTE, or a gNB in NR.

In step S900, the UE receives information on a prohibit timer from the network. The prohibit timer is used for preventing the UE from frequent triggering of the enhanced RLM reporting. The information on the prohibit timer may include a prohibit timer value for early-out-of-sync, and a prohibit timer value for early-in-sync. The prohibit timer value for early-out-of-sync and the prohibit timer value for early-in-sync may be 2 seconds, respectively. The information on the prohibit timer may be received via dedicated signaling. The dedicated signaling may be RRCConnectionSetup message, RRCConnectionResume message, RRCConnectionReestablishment message, or RRCConnectionReconfiguration message, etc. Alternatively, the information on the prohibit timer may be received via broadcast signaling, while in RRC_IDLE or RRC_CONNECTED. The broadcast signaling may be SystemInformationBlockType1, SystemInformationBlockType2, etc.

While in RRC_CONNECTED, radio signal quality becomes worse.

In step S910, upon receiving the first early-out-of-sync indication from lower layer of the UE, layer 3 of the UE (i.e. RRC layer) starts to count the number of early-out-of-sync indication up to a given value, i.e. N times. N may be same as N310, which is already used to detect out-of-sync.

In step S912, upon receiving N consecutive early-out-of-sync indication from lower layer of the UE, layer 3 of the UE starts a timer for triggering transmission of UEAssistanceInformation message to the network. The timer may be T310, which is already used to detect out-of-sync.

In step S914, upon expiry of the timer, the UE triggers transmission of the UEAssistanceInformation message including early-out-of-sync indication to the network.

Then, in step S916, the UE start a prohibit timer for early-out-of-sync indication to prevent transmission of the same early-out-of-sync indication while the prohibit timer is running.

In addition, in step S918, the UE cancels a prohibit timer for early-in-sync indication to prevent transmission of the early-in-sync indication, if running.

Upon receiving the UEAssistanceInformation message including the early-out-of-sync indication from the UE, the network may configure the UE with larger number of repetitions and/or higher aggregation level on MPDCCH to prevent RLF, via RRC connection reconfiguration procedure.

Meanwhile, radio signal quality becomes better.

In step S920, upon receiving the first early-in-sync indication from lower layer of the UE, layer 3 of the UE (i.e. RRC layer) starts to count the number of early-in-sync indication up to a given value, i.e. N times. N may be same as N311, which is already used to detect in-sync.

In step S922, upon receiving N consecutive early-in-sync indication from lower layer of the UE, the UE triggers transmission of the UEAssistanceInformation message including early-in-sync indication to the network.

Then, in step S924, the UE start a prohibit timer for early-in-sync indication to prevent transmission of the same early-in-sync indication while the prohibit timer is running.

In addition, in step S926, the UE cancels a prohibit timer for early-out-of-sync indication to prevent transmission of the early-out-of-sync indication, if running.

Upon receiving the UEAssistanceInformation message including the early-in-sync indication from the UE, the network may configure the UE with fewer repetitions and/or lower aggregation level on MPDCCH or CE mode change to save UE power and network resources, via RRC connection reconfiguration procedure.

Figure 10:
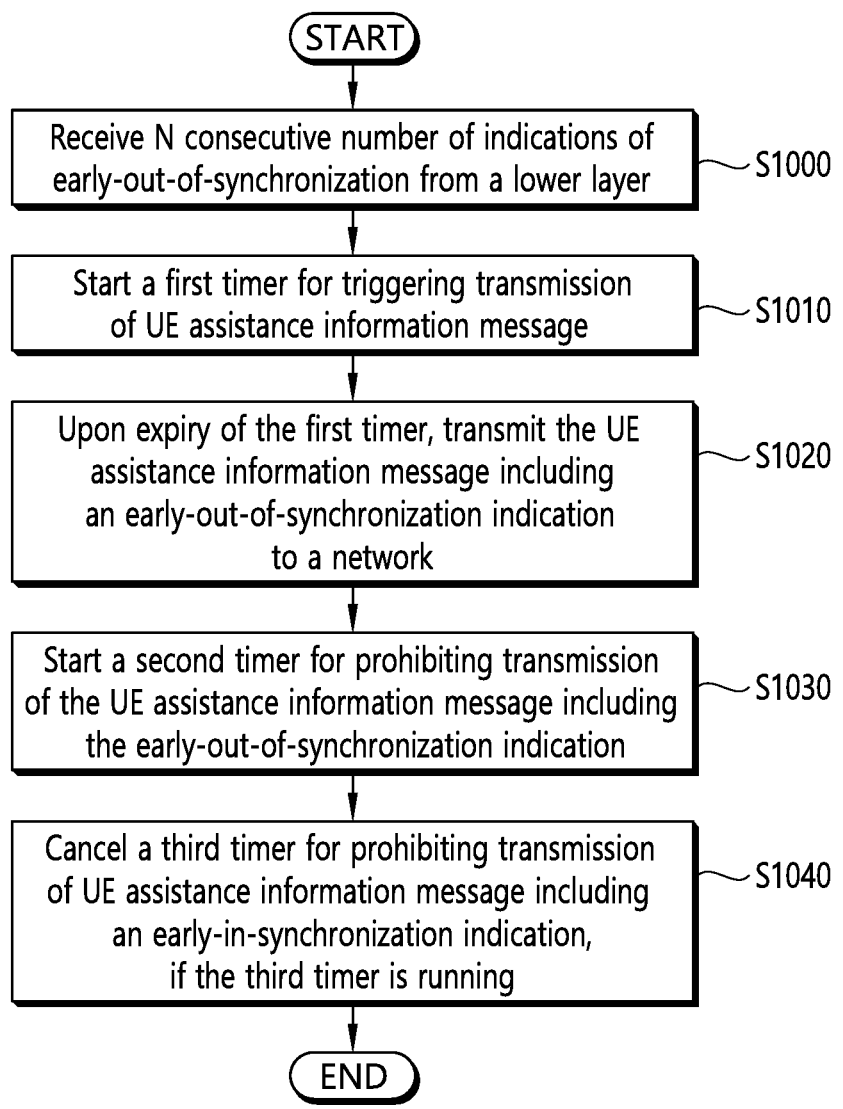
FIG. 10 shows a block diagram of a method for transmitting UE assistance information message by a UE according to an embodiment of the present disclosure.

FIG. 10 shows a block diagram of a method for transmitting UE assistance information message by a UE according to an embodiment of the present disclosure.

This embodiment corresponds to steps S910 to S918 in FIG. 9. In FIG. 10, the network may correspond to an eNB in LTE, or a gNB in NR.

In step S1000, the RRC layer of the UE receives N consecutive number of indications of early-out-of-synchronization from a lower layer of the UE. The N consecutive number may be N310, which is a maximum number of consecutive out-of-synchronization indications for a PCell received from the lower layer of the UE.

In step S1010, the RRC layer of the UE starts a first timer for triggering transmission of the UE assistance information message including an early-out-of-synchronization indication to a network. The first timer may be T310, which is used to trigger transmission of a UE assistance information message including an out-of-synchronization indication to the network.

In step S1020, upon expiry of the first timer, the RRC layer of the UE transmits the UE assistance information message including the early-out-of-synchronization to the network.

In step S1030, the RRC layer of the UE starts a second timer for prohibiting transmission of the UE assistance information message including the early-out-of-synchronization to the network. While the second timer is running, transmission of the UE assistance information message including the early-out-of-synchronization indication may be prohibited.

In step S1040, the RRC layer of the UE cancels a third timer for prohibiting transmission of a UE assistance information message including an early-in-synchronization indication, if the third timer is running.

The RRC layer of the UE may receive a value of the second timer and a value of the third timer from the network. The value of the second timer and the value of the third timer may be received from the network via dedicated signaling or broadcast signaling.

The RRC layer of the UE may receive an RRC connection reconfiguration message including at least one of larger number of repetitions or higher aggregation level on MPDCCH.

Figure 11:
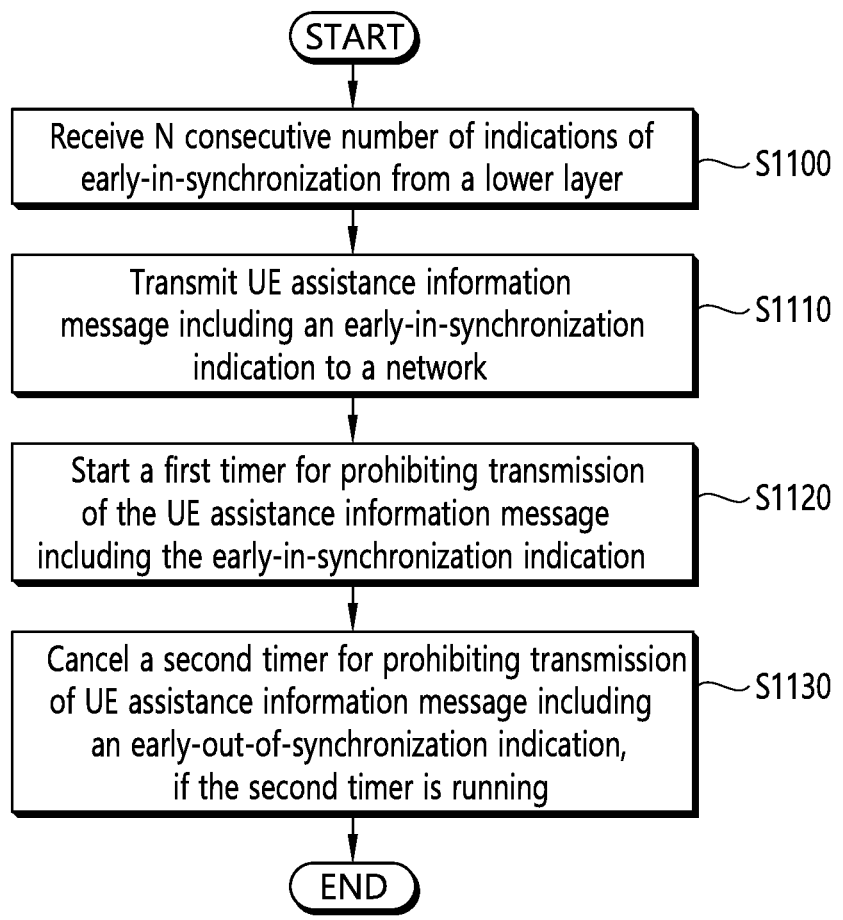
FIG. 11 shows a block diagram of a method for transmitting UE assistance information message by a UE according to another embodiment of the present disclosure.

FIG. 11 shows a block diagram of a method for transmitting UE assistance information message by a UE according to another embodiment of the present disclosure. This embodiment corresponds to steps S920 to S926 in FIG. 9. In FIG. 11, the network may correspond to an eNB in LTE, or a gNB in NR.

In step S1100, the RRC layer of the UE receives N consecutive number of indications of early-in-synchronization from a lower layer of the UE. The N consecutive number may be N311, which is a maximum number of consecutive in-synchronization indications for a PCell received from the lower layer of the UE.

In step S1110, the RRC layer of the UE transmits the UE assistance information message including an early-in-synchronization to a network.

In step S1120, the RRC layer of the UE starts a first timer for prohibiting transmission of the UE assistance information message including the early-in-synchronization to the network. While the first timer is running, transmission of the UE assistance information message including the early-in-synchronization indication may be prohibited.

In step S1130, the RRC layer of the UE cancels a second timer for prohibiting transmission of a UE assistance information message including an early-out-of-synchronization indication, if the second timer is running.

The RRC layer of the UE may receive a value of the first timer and a value of the second timer from the network. The value of the first timer and the value of the second timer may be received from the network via dedicated signaling or broadcast signaling.

The RRC layer of the UE may receive an RRC connection reconfiguration message including at least one of fewer number of repetitions or lower aggregation level on MPDCCH.

In the above embodiment of the present disclosure, N310/T310 are re-used for early-out-of-sync detection. However, a new value/timer, other than N310/T310, may be used for early-out-of-sync detection. That is, a definition of the value/timer may be needed to support the enhanced RLM reporting.

Figure 12:
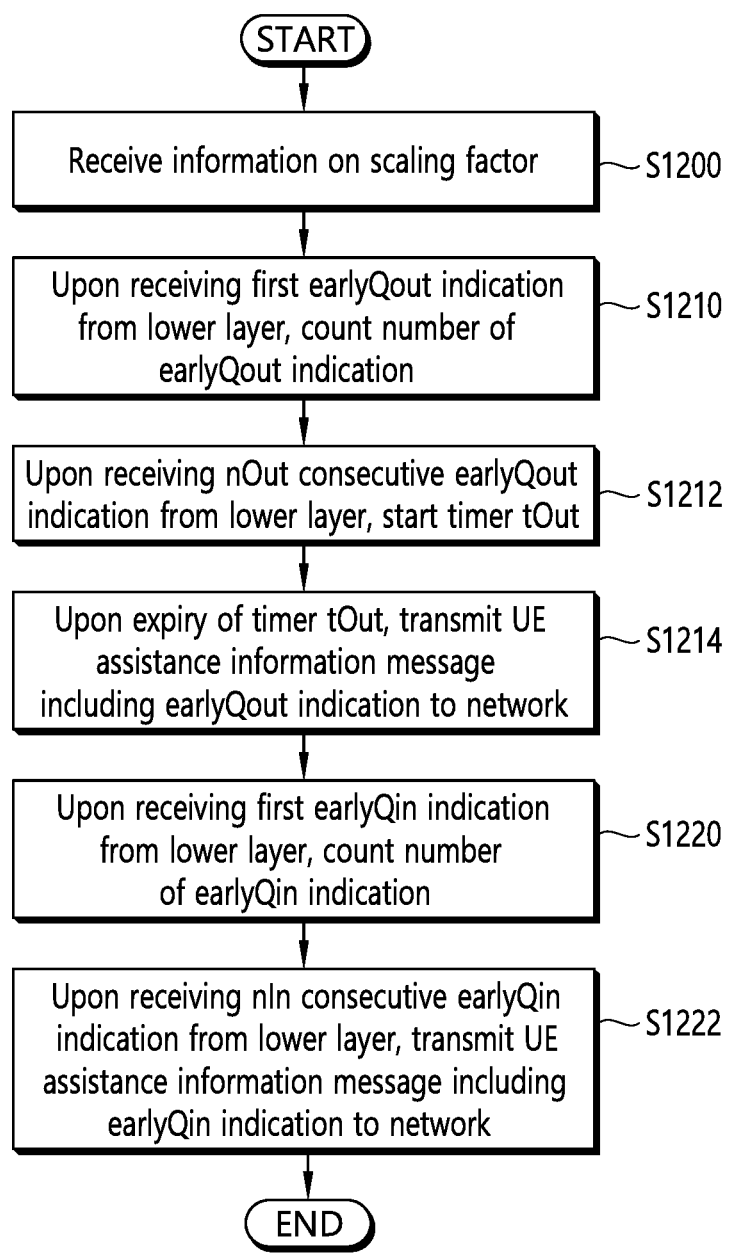
FIG. 12 shows a block diagram of a method for handling a prohibit timer for enhanced RLM reporting according to another embodiment of the present disclosure.

FIG. 12 shows a block diagram of a method for handling a prohibit timer for enhanced RLM reporting according to another embodiment of the present disclosure. In FIG. 12, the network may correspond to an eNB in LTE, or a gNB in NR.

In step S1200, the UE receives information on a scaling factor, which is a float value, from the network. The scaling factor is used for scaling the current value/timer, i.e. N310/N311/T310, for detecting early-out-of-sync/early-in-sync. A range of the scaling factor may be 0 to 1. For example, the scaling factor may have one of values among 0.25, 0.5, 0.75 or 1. The information on the scaling factor may be received via dedicated signaling. The dedicated signaling may be RRCConnectionSetup message, RRCConnectionResume message, RRCConnectionReestablishment message, or RRCConnectionReconfiguration message, etc. Alternatively, the information on the scaling factor may be received via broadcast signaling, while in RRC_IDLE or RRC_CONNECTED. The broadcast signaling may be SystemInformationBlockType1, SystemInformationBlockType2, etc.

While in RRC_CONNECTED, radio signal quality becomes worse.

In step S1210, upon receiving the first early-out-of-sync indication from lower layer of the UE, layer 3 of the UE (i.e. RRC layer) starts to count the number of early-out-of-sync indication up to a new value nOut. The new value nOut may be N310 multiplied by the scaling factor.

In step S1212, upon receiving nOut consecutive early-out-of-sync indication from lower layer of the UE, layer 3 of the UE starts a new timer tOut for triggering transmission of UEAssistanceInformation message to the network. The new timer tOut may be T310 multiplied by the scaling factor.

In step S1214, upon expiry of the new timer tOut, the UE triggers transmission of the UEAssistanceInformation message including early-out-of-sync indication to the network. Upon receiving the UEAssistanceInformation message including the early-out-of-sync indication from the UE, the network may configure the UE with larger number of repetitions and/or higher aggregation level on MPDCCH to prevent RLF, via RRC connection reconfiguration procedure.

Meanwhile, radio signal quality becomes better.

In step S1220, upon receiving the first early-in-sync indication from lower layer of the UE, layer 3 of the UE (i.e. RRC layer) starts to count the number of early-in-sync indication up to a new value nIn. The new value nIn may be N311 multiplied by the scaling factor.

In step S1222, upon receiving nIn consecutive early-in-sync indication from lower layer of the UE, the UE triggers transmission of the UEAssistanceInformation message including early-in-sync indication to the network. Upon receiving the UEAssistanceInformation message including the early-in-sync indication from the UE, the network may configure the UE with fewer repetitions and/or lower aggregation level on MPDCCH or CE mode change to save UE power and network resources, via RRC connection reconfiguration procedure.

Figure 13:
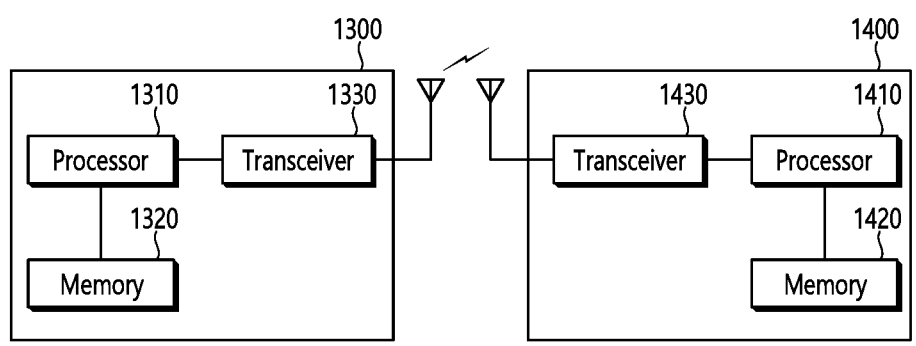
FIG. 13 shows a wireless communication system to implement an embodiment of the present disclosure.

FIG. 13 shows a wireless communication system to implement an embodiment of the present disclosure.

A UE 1300 includes a processor 1310, a memory 1320 and a transceiver 1330. The processor 1310 may be configured to implement proposed functions, procedures and/or methods described in this description. Layers of the radio interface protocol may be implemented in the processor 1310. The memory 1320 is operatively coupled with the processor 1310 and stores a variety of information to operate the processor 1310. The transceiver 1330 is operatively coupled with the processor 1310, and transmits and/or receives a radio signal.

A network node 1400 includes a processor 1410, a memory 1420 and a transceiver 1430. The processor 1410 may be configured to implement proposed functions, procedures and/or methods described in this description. Layers of the radio interface protocol may be implemented in the processor 1410. The memory 1420 is operatively coupled with the processor 1410 and stores a variety of information to operate the processor 1410. The transceiver 1430 is operatively coupled with the processor 1410, and transmits and/or receives a radio signal.

The processors 1310, 1410 may include application-specific integrated circuit (ASIC), other chipset, logic circuit and/or data processing device. The memories 1320, 1420 may include read-only memory (ROM), random access memory (RAM), flash memory, memory card, storage medium and/or other storage device. The transceivers 1330, 1430 may include baseband circuitry to process radio frequency signals. When the embodiments are implemented in software, the techniques described herein can be implemented with modules (e.g., procedures, functions, and so on) that perform the functions described herein. The modules can be stored in memories 1320, 1420 and executed by processors 1310, 1410. The memories 1320, 1420 can be implemented within the processors 1310, 1410 or external to the processors 1310, 1410 in which case those can be communicatively coupled to the processors 1310, 1410 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method for transmitting a user equipment (UE) assistance information message by a UE in a wireless communication system, the method comprising:

receiving, at a radio resource control (RRC) layer of the UE, N consecutive number of indications of early-out-of-synchronization from a lower layer of the UE;

starting, at the RRC layer of the UE, a first timer for triggering transmission of the UE assistance information message including an early-out-of-synchronization indication to a network;

upon expiry of the first timer, transmitting, at the RRC layer of the UE, the UE assistance information message including the early-out-of-synchronization indication to the network;

starting, at the RRC layer of the UE, a second timer for prohibiting transmission of the UE assistance information message including the early-out-of-synchronization indication to the network; and canceling, at the RRC layer of the UE, a third timer for prohibiting transmission of a UE assistance information message including an early-in-synchronization indication, if the third timer is running.

2. The method of claim 1, further comprising receiving, at the RRC layer of the UE, a value of the second timer and a value of the third timer from the network.

3. The method of claim 2, wherein the value of the second timer and the value of the third timer are received from the network via dedicated signaling or broadcast signaling.

4. The method of claim 1, further comprising prohibiting, at the RRC layer of the UE, transmission of the UE assistance information message including the early-out-of-synchronization indication, while the second timer is running.

5. The method of claim 1, further comprising receiving, at the RRC layer of the UE, an RRC connection reconfiguration message including at least one of larger number of repetitions or higher aggregation level on a machine-type communication (MTC) physical downlink control channel (MPDCCH).

6. The method of claim 1, wherein the first timer is T310, which is used to trigger transmission of a UE assistance information message including an out-of-synchronization indication to the network.

7. The method of claim 1, wherein the N consecutive number is N310, which is a maximum number of consecutive out-of-synchronization indications for a primary cell (PCell) received from the lower layer of the UE.

8. The method of claim 1, wherein the network corresponds to an eNodeB (eNB) in long-term evolution (LTE) or a gNB in a new radio access technology (NR).

9. The method of claim 1, wherein the UE is in communication with at least one of a mobile device, a network, and/or autonomous vehicles other than the UE.

10. A method for transmitting a user equipment (UE) assistance information message by a UE in a wireless communication system, the method comprising:

receiving, at a radio resource control (RRC) layer of the UE, N consecutive number of indications of early-in-synchronization from a lower layer of the UE;

transmitting, at the RRC layer of the UE, the UE assistance information message including an early-in-synchronization indication to a network;

starting, at the RRC layer of the UE, a first timer for prohibiting transmission of the UE assistance information message including the early-in-synchronization indication to the network; and canceling, at the RRC layer of the UE, a second timer for prohibiting transmission of a UE assistance information message including an early-out-of-synchronization indication, if the second timer is running.

11. The method of claim 10, further comprising receiving, at the RRC layer of the UE, a value of the first timer and a value of the second timer from the network.

12. The method of claim 11, wherein the value of the first timer and the value of the second timer are received from the network via dedicated signaling or broadcast signaling.

13. The method of claim 10, further comprising prohibiting, at the RRC layer of the UE, transmission of the UE assistance information message including the early-in-synchronization indication, while the first timer is running.

14. The method of claim 10, further comprising receiving, at the RRC layer of the UE, an RRC connection reconfiguration message including at least one of fewer number of repetitions or lower aggregation level on a machine-type communication (MTC) physical downlink control channel (MPDCCH).

15. The method of claim 10, wherein the N consecutive number is N311, which is a maximum number of consecutive in-synchronization indications for a primary cell (PCell) received from the lower layer of the UE.

16. The method of claim 10, wherein the network corresponds to an eNodeB (eNB) in long-term evolution (LTE) or a gNB in a new radio access technology (NR).

* * * * *